ELECTROLUMINESCENT CIRCUIT ELEMENT

Filed April 28, 1961

INVENTOR.
EDWIN R. BOWERMAN, JR.
BY
R. J. Frank
ATTORNEY 3,112,405
Patented Nov. 26, 1963

3,112,405

ELECTROLUMINESCENT CIRCUIT ELEMENT

Edwin R. Bowerman, Jr., Whitestone, N.Y., assignor to General Telephone and Electronics Laboratories, Inc., a corporation of Delaware Filed Apr. 28, 1961, Ser. No. 106,344
8 Claims. (Cl. 250—213)

Figure 1:
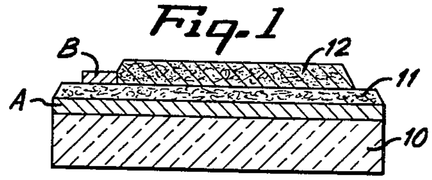

This invention relates to circuit elements and devices utilizing electroluminescent and photoconductive materials.

Layers of electroluminescent and photoconductive materials interposed between two electrodes have been employed in many types of electronic circuit elements. In designing these elements, an effort is usually made to reduce the distributed capacitances inherent in this type of construction and to obtain circuit elements in which the capacitances and resistances are essentially lumped. However, I have invented a new circuit element employing photoconductive and electroluminescent layers in which the distributed capacitances are used to provide novel electronic functions not heretofore obtainable.

Accordingly it is an object of my invention to provide a new type of circuit element employing electroluminescent and photoconductive layers.

It is another object of my invention to provide a circuit element employing electroluminescent and photoconductive layers which has distributed optical and electrical characteristics.

Still another object is to provide a circuit element in which the capacitance increases with increases in applied voltage.

Yet another object is to provide a circuit element which gives a visual indication of changes in the magnitude of the applied voltage.

A further object is to provide a circuit element in which the current varies in a non-linear manner with changes in the magnitude of the applied voltage.

Yet a further object of the invention is to provide a circuit element employing electroluminescent and photoconductive layers which may be used as a bistable device.

In the present invention a circuit element is provided in which a first electrode is affixed to one surface of an electroluminescent layer. A photoconductive layer is affixed to the other surface of the electroluminescent layer and is optically and capacitively coupled thereto, the optical and capacitive coupling between the electroluminescent and photoconductive layers being effectively distributed along the boundary between the two layers. A second electrode conductively connects one end of the photoconductive layer to a portion of the electroluminescent layer.

When a given voltage is applied across the first and second electrodes, the portion of the electroluminescent layer therebetween emits light. As the applied voltage is increased in magnitude, the light emitting area of the electroluminescent layer increases and illuminates more of the photoconductive layer. When light falls on the photoconductive layer its resistance decreases. Thus, increasing the applied voltage causes the illuminated area of the photoconductive layer to increase. Also, decreasing the resistance of the photoconductive layer causes the distributed capacitance between the electroluminescent and photoconductive layers to present a higher effective capacitance between the first and second electrodes as the magnitude of the applied voltage is increased.

In another embodiment of the invention, one surface of an electroluminescent layer is affixed to first and third spaced, transparent electrodes secured to a glass substrate. Second and fourth spaced transparent electrodes are affixed to the other surface of the electroluminescent layer, the distance between the second and fourth electrodes being several times greater than the distance between the first and third electrodes. A photoconductive layer is interposed between the second and fourth electrodes and is optically coupled to the electroluminescent layer. The ends of the photoconductive layer are conductively connected to the second and fourth electrodes respectively while the portion of the photoconductive layer between the second and fourth electrodes is in intimate contact with the electroluminescent layer.

By connecting the first and third electrodes together and coupling an alternating voltage source across the first and second electrodes, a device having an input capacitance which increases with increases in applied voltage is obtained. Also, when the device is viewed through the first and third transparent electrodes, a bar of light appears on the electroluminescent layer which widens as the voltage is increased. If the voltage is raised sufficiently, the entire photoconductor between the second and fourth electrodes is illuminated by the electroluminescent layer and becomes conductive.

In another application of the invention, an alternating voltage is coupled across the second and fourth electrodes. With this connection, the current flowing between these electrodes is a non-linear function of the voltage across them.

A bistable device may be constructed using my invention by connecting a low impedance pulse voltage source between the first and third electrodes and an alternating voltage source between the first and second electrodes. The area of the second electrode is made relatively small with respect to that of the fourth electrode and the gap between the first and third electrodes is closer to the second electrode than to the fourth electrode. When a short duration, high voltage pulse is applied between the first and third electrodes, the electroluminescent layer is momentarily brightened illuminating the entire photoconductor between the second and fourth electrodes. The resistance of the photoconductor is reduced to a low value and acts as the top electrode of the electroluminescent layer. As a result the entire electroluminescent layer remains lit until the alternating voltage source is removed.

Figure 2A:
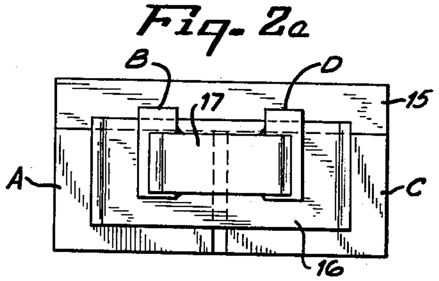
Figure 3A:
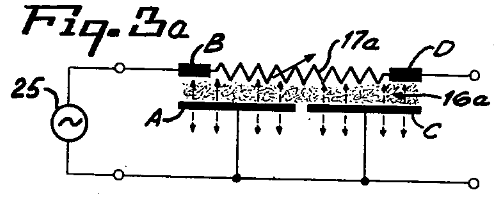
Figure 2B:
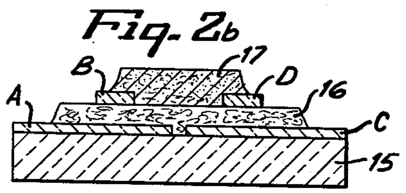
Figure 4A:
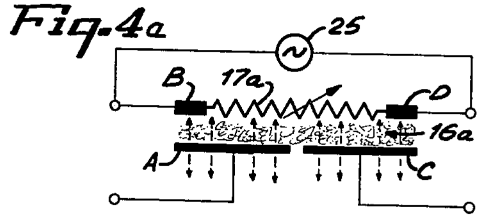
Figure 3B:
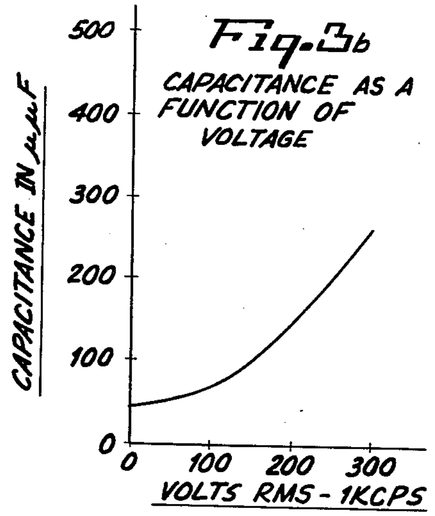
Figure 4B:
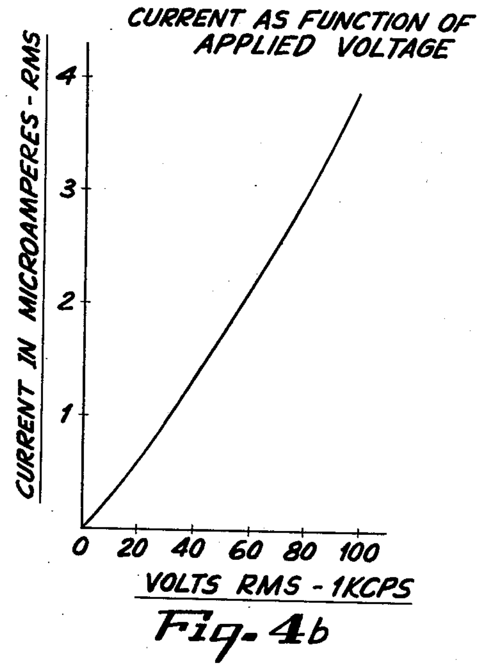
Figure 5:
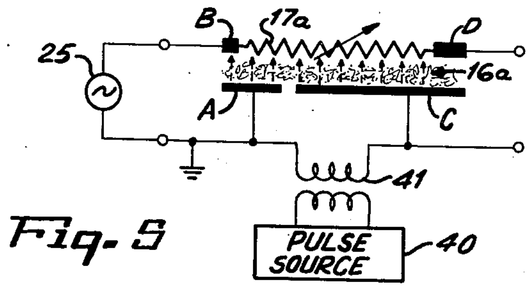

The above objects of and the brief introduction to the present invention will be more fully understood and further objects and advantages will become apparent from a study of the following description in connection with the drawings, wherein:

FIG. 1 is a cross-sectional view of one form of my circuit element;

FIG. 2*a* is a plan view and FIG. 2*b* is a cross-sectional elevation view of another form of my circuit element;

FIG. 3*a* shows the circuit element connected to provide a device in which the input capacitance increases with increasing applied voltage, and FIG. 3*b* is a graph showing the relationship between the applied voltage and input capacitance for the device of FIG. 3*a*;

FIG. 4*a* depicts the circuit element of FIGS. 2*a* and 2*b* connected to provide a device in which the input circuit varies non-linearly with changes in applied voltage, and FIG. 4*b* is a graph showing the relationship between the applied voltage and the input current for the device of FIG. 4*a*; and, FIG. 5 is an equivalent circuit showing the circuit element of FIGS. 2*a* and 2*b* connected to provide a bistable device.

Referring to FIG. 1, there is shown a circuit element comprising a first transparent electrode A secured to a glass substrate 10. An electroluminescent layer 11 (which emits light when a voltage is applied across it) is affixed to the top surface of electrode A. Electrode A may consist of any transparent, conductive coating, such as tin oxide, while electroluminescent layer 11 is formed of zinc sulfide activated with copper and coactivated with a chloride. A photoconductive layer 12, consisting of cadmium sulfide or cadmium selenide, is placed in intimate contact with the top surface of the electroluminescent layer 11. Photoconductive layer 12 has a high electrical resistance when it is in the dark and a considerably lower resistance when it is illuminated. A second electrode B conductively joins one end of the photoconductive layer 12 to a portion of electroluminescent layer 11.

When a voltage is applied between electrodes A and B, the portion of the electroluminescent layer 11 between the electrodes emits light. Increasing the voltage between electrodes A and B causes the light to fall upon photoconductive layer 12 increasing the area of the electroluminescent layer which is energized and increasing the capacitance of the device between the two electrodes.

Another embodiment of the invention is shown in the plan and elevation views of FIGS. 2*a* and 2*b* respectively. In this form of the invention, first and third spaced transparent electrodes A and C are secured to the glass substrate 15. An electroluminescent layer 16 is affixed to electrodes A and C filling the gap between them. Second and fourth electrodes B and D respectively are secured to the top surface of electroluminescent layer 16 and a photoconductive layer 17 is deposited between the electrodes on the top surface of electroluminescent layer 16. Electrodes B and D make contacts with the ends of photoconductive layer 17 while the portion of layer 17 between the contacts makes intimate contact with electroluminescent layer 16.

Electroluminescent layer 16 by both capacitively and optically coupled to photoconductive layer 17. The capacitive coupling is in the form of a distributed capacitance between the bottom electrodes A, C and the photoconductive layer 17; that is, photoconductive layer 17 acts effectively as top electrode for electroluminescent layer 16. In the form of the invention shown in FIGS. 2*a* and 2*b* the gap between electrodes A and C is midway between electrodes B and D. As will be seen hereinafter, for some applications, the gap between electrodes A and C is not symmetrically located with respect to electrodes B and D.

In FIG. 3*a* there is shown an equivalent circuit of the device of FIGS. 2*a* and 2*b*. The photoconductor layer 17 between electrodes B and D is represented by a variable resistor 17*a* connected to the electrodes at each end. The distributed capacitance between electrodes A, C and the photoconductive layer 17 is indicated by the extension of electrodes A and B parallel to the photoconductor 17*a*. The space between electrodes A, B and photoconductor 17*a* contains the electroluminescent layer 16*a*, the light emitted by the electroluminescent layer being indicated by the dashed arrows.

In the circuit shown in FIG. 3*a*, an alternating voltage source 25 is coupled across electrodes A and B. Electrodes A and C are connected together. The applied voltage causes the portion of the electroluminescent layer immediately between electrode B and electrode A to emit light. As voltage source 25 is increased in magnitude, the light emitted by electroluminescent layer 16*a* spreads over a greater area and impinges upon the photoconductor 17*a* thereby decreasing the resistance of a portion of the photoconductor near electrode B. Since the series resistance (that is the resistance of the photoconductor 17*a*) is decreased, the capacitance between electrodes A and B increases as the distributed capacitance between the electrodes becomes more effective. Further increases in applied voltage causes further increases in capacitance producing the relationship shown in FIG. 3*b*. The curve of FIG. 3*b* was obtained with a circuit element having a gap between electrodes A and C of .005 inch at a frequency of 1000 cycles per second.

When the device of FIG. 3*a* is viewed through transparent electrodes A and C, it is found that increasing the magnitude of voltage source 25 increases the illuminated area of electroluminescent layer 16*a*. The illuminated area begins at electrode B and spreads across the device as the voltage is increased ultimately reaching electrode D. Thus, the circuit element shown in FIG. 3*a* can be used both as a variable capacitance device in which the capacitance increases with applied voltage and as a device which indicates the magnitude of an applied voltage.

FIG. 4*a* illustrates a form of the invention in which the voltage source 25 is connected between electrodes B and D. The applied voltage produces an electric field extending through electroluminescent layer 16*a* causing it to emit light. As the magnitude of voltage source 25 is increased, the brightness of the light emitted by electroluminescent layer 16*a* increases and the resistance of the illuminated portion of photoconductor 17*a* decreases. As a result, the current flowing between electrodes B and D increases as a non-linear function of the applied voltage. The relationship between the current and applied voltage for a device having the same dimension as that shown in FIG. 3*a* is depicted in FIG. 4*b*.

In FIG. 5, the circuit element has been connected to provide a bistable device. A pulse source 40 is connected through a transformer 41 across electrodes A and C and an alternating voltage source 25 is coupled between electrodes A and B. The area of electrode B is made relatively small with respect to that of electrode D and the gap between electrodes A and C is closer to electrode B than to electrode D. When a short duration, high voltage pulse is applied by source 40 to electrodes A and C, the electroluminescent layer 16*a* is momentarily brightened illuminating the entire photoconductor 17*a*. The resistance of the entire photoconductor 17*a* is thereby reduced to a low value and the photoconductor functions as the top electrode of the electroluminescent layer 16*a*. Under these conditions, the electroluminescent layer 16*a* will continue to emit light after the pulse source 40 has been energized. The device is returned to its initial state by disconnecting voltage source 25.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An electroluminescent circuit element comprising an electroluminescent layer having first and second surfaces; a first pair of spaced electrodes affixed to one surface of said electroluminescent layer; a second pair of spaced electrodes affixed to the other surface of said electroluminescent layer; and a photoconductive layer interposed between said second pair of spaced electrodes, said photoconductive layer being in intimate contact with said electroluminescent layer and optically coupled thereto.

2. An electroluminescent circuit element comprising an electroluminescent layer having first and second surfaces; a first pair of spaced electrodes affixed to one surface of said electroluminescent layer; a second pair of spaced electrodes symmetrically disposed with respect to said first pair of electrodes affixed to the other surface of said electroluminescent layer, the distance between said second pair of electrodes being greater than the distance between said first pair of electrodes; and a photoconductive layer interposed between said second pair of electrodes, said photoconductive layer being in intimate contact with said electroluminescent layer and optically coupled thereto.

3. An electroluminescent circuit element comprising an electroluminescent layer having first and second surfaces; first and third transparent electrodes affixed to one surface of said electroluminescent layer, said first and third transparent electrodes having adjacent parallel spaced edges; second and fourth spaced electrodes affixed to the other surface of said electroluminescent layer, said second and fourth electrodes having adjacent edges extending parallel to said equidistantly spaced from the adjacent edges of said first and third electrodes; and a photoconductive layer interposed between said first and third electrodes, said photoconductive layer being in intimate contact with said electroluminescent layer and optically coupled thereto.

4. An electroluminescent circuit element comprising an electroluminescent layer having first and second surfaces; first and third transparent electrodes affixed to one surface of said electroluminescent layer, said first and third transparent electrodes having adjacent parallel spaced edges; second and fourth spaced electrodes affixed to the other surface of said electroluminescent layer, said second and fourth electrodes having adjacent edges extending parallel to and equidistantly spaced from the adjacent edges of said first and third electrodes; a photoconductive layer interposed between said first and third electrodes, said photoconductive layer being in intimate contact with said electroluminescent layer and optically coupled thereto; means conductively connecting said first and third electrodes; and an alternating voltage source coupled between said first and second electrodes, the capacitance between said first and second electrodes increasing as the magnitude of said voltage source is increased.

5. An electroluminescent circuit element comprising an electroluminescent layer having first and second surfaces; first and third transparent electrodes affixed to one surface of said electroluminescent layer, said first and third transparent electrodes having adjacent parallel spaced edges; second and fourth spaced electrodes affixed to the other surface of said electroluminescent layer, said second and fourth electrodes having adjacent edges extending parallel to and equidistantly spaced from the adjacent edges of said first and third electrodes; a photoconductive layer interposed between said second and fourth electrodes, said photoconductive layer being in intimate contact with said electroluminescent layer and optically coupled thereto; and an alternating voltage source coupled between said second and fourth electrodes, the current flowing between said second and fourth electrodes increasing non-linearly with increases in the magnitude of said voltage source.

6. A bistable electroluminescent device comprising an electroluminescent layer having first and second surfaces; first and third transparent spaced electrodes affixed to one surface of said electroluminescent layer, said first and third electrodes having adjacent parallel spaced edges with a gap therebetween; second and fourth spaced electrodes having adjacent edges parallel to the adjacent edges of said first and third electrodes; said second electrode having a smaller area and being closer to the gap between said first and third electrodes than said fourth electrode, the gap between said second and fourth electrodes being greater than the gap between said first and third electrodes, a photoconductive layer interposed between said second and fourth electrodes, said photoconductive layer being in intimate contact with said electroluminescent layer and optically coupled thereto, an alternating voltage source coupled between said first and second electrodes, and a pulse voltage source coupled between said first and third electrodes, a voltage pulse applied from said pulse voltage source causing said electroluminescent layer to emit light until said alternating voltage source is removed.

7. An electroluminescent circuit element comprising an electroluminescent layer having first and second surfaces; a photoconductive layer optically and capacitively coupled to said electroluminescent layer, said optical and capacitive coupling being distributed along the boundary between said photoconductive and electroluminescent layers; first and third spaced electrodes affixed to the first surface of said electroluminescent layer; and second and fourth spaced electrodes conductively joining the ends of said photoconductive layer to a portion of the second surface of said electroluminescent layer.

8. An electroluminescent circuit element comprising a transparent non-conductive substrate; an electroluminescent layer having first and second surfaces; first and third transparent electrodes interposed between said substrate and the first surface of said electroluminescent layer, said first and third transparent electrodes having adjacent spaced edges; second and fourth transparent electrodes affixed to the other surface of said electroluminescent layer, said second and fourth transparent electrodes having adjacent spaced edges extending in the same direction as the adjacent edges of said first and third electrodes, the distance between said first and third electrodes being small relative to the distance between said second and fourth electrodes; and a photoconductive layer interposed between said second and fourth electrodes, said photoconductive layer being in intimate contact with said electroluminescent layer and optically coupled thereto.

References Cited in the file of this patent

UNITED STATES PATENTS 2,942,120 Kazan ------------------ June 21, 1960